United States Patent [19]

Chataigner et al.

[11] 4,059,524

[45] Nov. 22, 1977

[54] WATER PURIFYING DEVICE WITHOUT MOVABLE MECHANICAL PART IN CONTACT WITH THE LIQUID TO BE TREATED

[76] Inventors: Jean Chataigner, 11 rue Hemingway la chaine, Plaisir 78370; Jean-Claude Joseph Rader, 2 rue Paul Gimont, 92500 Rueil Malmaison, both of France

[21] Appl. No.: 685,418

[22] Filed: May 11, 1976

[30] Foreign Application Priority Data

May 15, 1975 France .................................. 75.15255

[51] Int. Cl.² ........................... C02B 1/34; C02C 5/04
[52] U.S. Cl. ................................. 210/220; 210/63 R; 210/205; 210/207
[58] Field of Search ........... 210/221 R, 221 M, 221 P, 210/220, 63, 198, 205, 207, 208

[56] References Cited

U.S. PATENT DOCUMENTS

| | | | |
|---|---|---|---|
| 1,159,044 | 11/1915 | Kelly, Jr. ...................... | 210/221 R |
| 2,987,186 | 6/1961 | Burgoon et al. ................. | 210/220 X |
| 3,116,347 | 12/1963 | Allen .............................. | 210/220 X |
| 3,567,021 | 3/1971 | Morriseau, Jr. ................ | 210/208 X |
| 3,756,410 | 9/1973 | Moody et al. ................... | 210/220 X |

*Primary Examiner*—R.E. Serwin
*Attorney, Agent, or Firm*—Cushman, Darby & Cushman

[57] ABSTRACT

The present invention relates to a water purifying device for treating the waste and cess water from an individual or collective house. Such a water purifying device comprises a tight tank, a feeding pipe and an exhaust pipe extending inside the tank in order to provide siphons, and air compressor supplying a control valve is provided which supplies air alternately to a pipe submerged in the liquid in the tank or to the air space above the tank. According to one mode of operation, the tank is maintained under a variable pressure always higher than the atmospheric pressure during the treatment operation.

9 Claims, 2 Drawing Figures

WATER PURIFYING DEVICE WITHOUT MOVABLE MECHANICAL PART IN CONTACT WITH THE LIQUID TO BE TREATED

BACKGROUND OF THE INVENTION

1. Field of the Invention

The present invention relates to a water purifying device, more particularly a domestic purifying device, and to the method carried out in such a device.

2. Description of the Prior Art

The water purifying devices of the prior art usually comprise a constant level tank having two chambers separated by a substantially vertical wall, in order to define an oxidation chamber and a decanting chamber. Used water comes into the oxidation chamber, wherein a pumping means mixes it, and whereafter flows into the decanting chamber when a new amount of used water is brought into the oxidation chamber. In the decanting chamber, muds deposit at the bottom of the chamber, wherefrom they could be brought back to the oxidation chamber through an opening set in the lower part of the decanting chamber. Clarified water flows out through an exhaust port at the upper part of the tank.

In such devices of the prior art, the decanting chamber is generally smaller than the oxidation chamber, for reasons of overall dimensions. When the tank is fed with a certain amount of used water, this tank being a constant level tank, the same amount of clarified water must leave the decanting chamber. If the amount of used water is bigger than the volume of cleaned water in the decanting chamber, there is a part of the evacuated water which is not enough decanted, i.e. an amount of the biological muds flows out, weakening the active water purifying material of the tank. After an intensive utilization period, the small quantity of biological muds remaining in such a tank is no more sufficient for the treatment of used water : on the first hand, used water is not conveniently cleaned, and on the other hand the tank turns stinking.

One way to avoid such drawbacks is to increase the dimensions of the oxidation chamber and of the decanting chamber, in order that they have an inner volume always greater than the volume of used water introduced during the peak hours. Such as increase of the overall dimensions presents major drawbacks with respect to the installation of the purifying device as well with respect to the installation of the purifying device as well with respect to the necessary energy consumption to set in motion the mass of water in the oxidation chamber.

According to another embodiment of the prior art, there is provided a sole tank which receives used water and biological muds and which communicates with the atmospheric pressure. Products contained in the tank are regularly aerated, they decant during a long period of time, after what a pumping means discharges the purified water. Such a device also presents the drawback of making the water flow through a mechanical apparatus having movable parts, such as a pump.

OBJECTS OF THE INVENTION

One object of the present invention is to provide a purifying device which allows a better treatment of used water while having a great volume ratio of the treated water to the tank, and which is not affected by peak hours.

Another object of the present invention is to provide a purifying device, which does not comprise any movable part in contact with the effluent to be treated or treated.

A further object of the present invention is to provide a purifying device wherein the effluent to be treated is oxidized in a particularly efficient way, in order to eventually make the treatment cycle shorter.

SUMMARY OF THE INVENTION

In order to meet the above objects, there is provided a purifying device having a tank comprising a single chamber which is alternatively used as an oxidation chamber and as a decanting chamber.

According to the present invention, the tank is not a constant level tank, but in the opposite a tank which is progressively filled up without liquid outflow, and afterwards, after a periodically running period of treatment, whatever be the liquid level in the tank, the clarified water is discharged when keeping at least the necessary amount of biological muds for a good use of the device.

The method for treating the used water according to the present invention generally includes the following steps:

to feed the tank with used water without withdrawing the yet clarified water;

to oxidize and periodically make homogeneous the products in the tank;

to let the product decant in the tank during a long period of time sufficient for the separation of clarified water and biologogical muds;

to discharge the clarified water after each prolongated decanting.

According to a feature of the present invention, the method will run while maintaining above the products in the tank a variable pressure always at least slightly higher than the atmospheric pressure. However, and without injuring the method according to the present invention, it is possible to provide a decanting step with a tank connected to the atmospheric pressure.

According to another feature of the present invention, the tank is provided with feeding pipe means and exhaust pipe means, realizing a siphon in cooperation with the liquid in the tank. This siphon permits the elimination of any mechanical movable part in contact with the effluent to be treated or treated.

One advantage of the present invention is to obtain a more efficient treatment, and thus to make the treating cycle shorter.

One other advantage is that no mechanical movable parts are in contact with the effluents, therefore ensuring a higher security in use.

BRIEF DESCRIPTION OF THE DRAWINGS

Other features and advantages of the present invention will appear in the following description made in relation with the herewith enclosed drawings, on which.

DETAILED DESCRIPTION OF THE DRAWINGS

Figure 1:
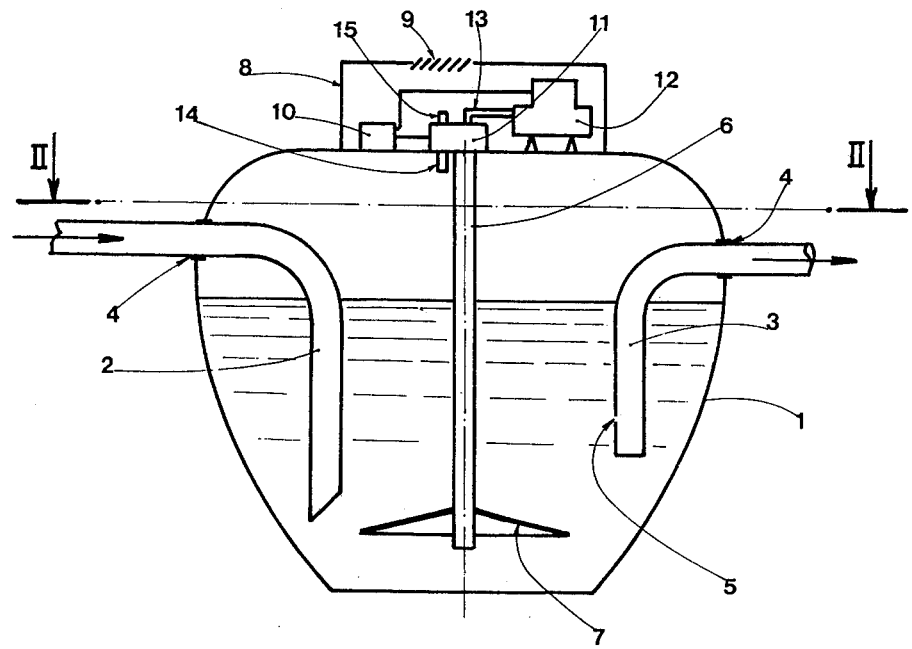
FIG. 1 is a cross-section following the line I—I of the FIG. 2, of a water purifying device carrying out the method of the present invention.
Figure 2:
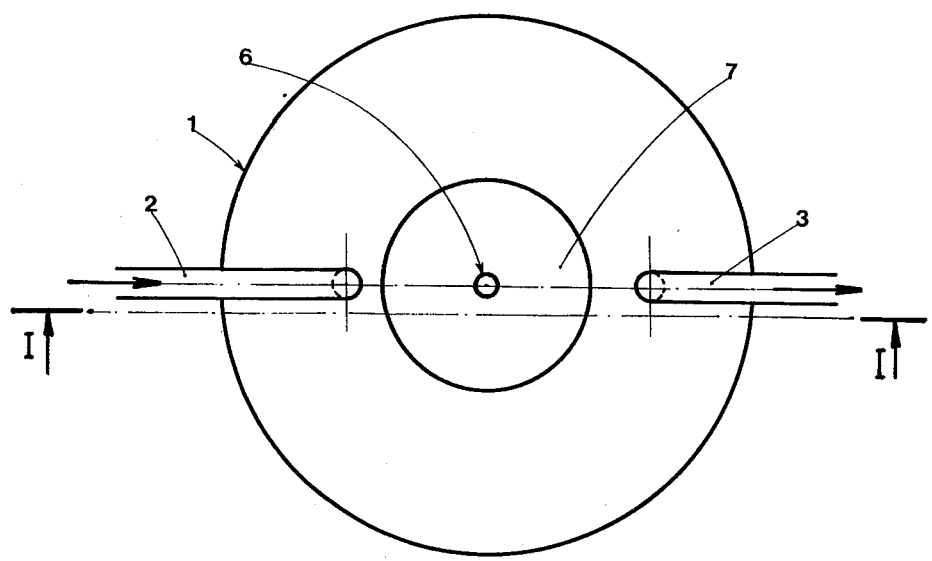
FIG. 2 is a cross-section following the line II—II on the FIG. 1.

The water purifying device according to the present invention comprises a tank 1 with a generally circular horizontal section and a slightly truncated vertical section, which may however have any appropriate other form. This tank is equipped, on one side of the tank, with a feeding pipe 2 for receiving the used water which extends downwards approximately to the bottom of the tank and, on the other side of the tank, with an exhaust pipe 3 for discharging treated effluents. The passage for the exhaust pipe 3 through the wall of the tank is at a slightly lower level than the passage for the feeding pipe 2 so that, when a pressure is applied to the surface of the liquid in the tank, as it will be seen further, used water escapes through the exhaust port without stemming within the feeding pipe. Likely, the lower end of the exhaust pipe is at a slightly higher level than the end of the feeding pipe in order to avoid any backflow of the air in the feeding pipe when discharging the purified water. In a preferred embodiment, the feeding pipe and the exhaust pipe are set on opposite walls of the tank 1. At the places where the pipes 2 and 3 pass through the tank walls, liquid- and gas-tight seals 4 are provided. The exhaust pipe also comprises at a determined distance from its lower end an opening 5, having a function which will be later seen in relation with the use of the device.

Ventilating means comprise an air feeding pipe 6 which roughly extends downwards to the bottom of the tank, and which includes a cupola 7 set slightly above the lower end of the air feeding pipe 6. This cupola is preferably cone-shaped with the vertex directed upwards, but can be of any appropriate form, and in particular can comprise holes providing passages for the air fed by the pipe 6, and radial stiffening ribs to give a better stiffness. According to another embodiment of the ventilating means, it is also possible to replace the cupola 7 by a perforated ramp connected to the lower end of the air feeding pipe 6 and horizontally set at the bottom of the tank in order to produce a mixing vortex, that simultaneously achieves an oxygenation and an homogeneization of the liquid and of the muds in the tank.

The tank 1 comprises an upper box 8 having openings 9. The upper box 8 includes a clock 10, a control valve 11 controlled by the clock and an air compressor 12 also controlled by the clock 10.

The control valve 11 preferably is a control valve having movable parts actuated by an electro-magnet which is controlled by the clock 10. This control valve is, for example, a control valve having an inlet 13 and two exhaust ports, which are respectively connected to a known structure and comprising a sleeve 14 and to the pipe 6. This control valve also comprises a venting port 15 directed towards the inside of the upper box. This control valve is provided in such a way that, in a first position, the inlet 13 is connected with the pipe 6, and the sleeve 14 is connected with the venting port 15, and in a second position the inlet 13 is connected with the sleeve 14 and the pipe 6 is tightly closed. As shown on FIG. 1, the sleeve 14 extends downwards in the tank in such a manner that it will never be immersed in the liquid. It is also possible to provide a control valve having exhaust ports connected directly to the tank, without the sleeve 14.

According to a feature of the present invention, the venting port 15 of the control valve includes a calibrated nozzle limiting the airflow, in order to ensure a slight excess of pressure in the tank on ventilating operation. The applicants have noticed that such an excess of pressure gives better result in the aeration of the effluents to be clarified. It is clear for those skilled in the art, that the dimension of the nozzle must ensure an excess of pressure just sufficient for obtaining a better treatment of the water, but not sufficient to discharge the liquid through the exhaust pipe 3.

According to another embodiment (not shown) of the present invention, the venting port 15 may be connected with the upper end of the feeding pipe 2, in such a manner that, when aerating, the air, which is sometimes malodorous, is discharged at the upper part of the house, for example, by means of the primary ventilation of the main sewer.

It will also be noted that the lower end of the exhaust pipe 3 is located at a height sufficient to leave the necessary quantity of biological muds at the bottom of the tank when the clarified water is discharges, as it will be seen further.

The purifying device according to the present invention is provided to receive all the used waters (cesswater and waste-water) from a house, and its volume shall be so calculated that it can receive a quantity of used water introduced during a whole cycle, the cycle period being generally a day. It will be clear for those skilled in the art according to the following way of operation of the purifying plant that the dimensions can be adapted to any sort of cycle. Used waters are progressively introduced in the tank through the feeding pipe 2. They are mixed with the liquid in the tank. At regular intervals of time, for example each hour, the clock 10 actuates the air compressor 12 and maintains the control valve 11 in a position where the air compressed by the air compressor 12 is delivered to the pipe 6, whereas the upper part of the tank is connected through the sleeve 14 to the venting port 15, therefore creating a slight excess of pressure of the tank. The air, thus dispersed in the liquid, causes the necessary oxygenation for purification during a predetermined period of time, for example a quarter of an hour, this period being controlled by the clock 10.

In order to avoid the liquid to flow back in the feeding pipe 6, a non-return valve (not shown) is provided to avoid the air in the pipe 6 to flow back towards the air compressor.

The applicants have also noted that it is better to keep a slight excess of pressure in the upper part of the tank, even during the decanting periods. According to a feature of the present invention, the venting port 15 is closed at the end of each oxygenation period. For this purpose, on the first hand the control valve is brought back in the position where it connects the sleeve 14 to the inlet 13, that shuts the passage to the venting port 15, and on the other hand a non-return valve is set in the pipe connecting the air compressor and the control valve, this non-return valve preventing a flow from the control valve to the air compressor. It could be better, in certain cases, to let the products decant while maintaining them at the atmospheric pressure; the control valve will thus stay in the position, where there is a connection between the sleeve 14 and the venting port 15.

The clock 10 is set in order to keep the air compressor 12 out for a sufficient period of time after a determined number of oxygenation periods (this number depending on the nominal capacity of the tank and being easily computed by those skilled in the art), to permit the decantation of the muds in the tank. After a sufficient clarification period either under pressure or at atmospheric pressure (e.g. about four hours), the clock actuates the control valve to connect the inlet 13 and the sleeve 14, and to close the pipe 6 at its upper end, whereas the venting port 15 is no more connected to the inside of the tank. Whereafter the air compressor 12 runs again and ensures above the liquid level a pressure higher than the atmospheric pressure. The tank 1 being tight and the outlet of the pipe 3 being at a lower level than the inlet of the pipe 2, clarified waters are discharged through the outlet until the liquid level reaches the unpriming hole 5 located near the lower end of the exhaust pipe 3.

When the liquid level reaches the unpriming hole, air under pressure enters the exhaust pipe 3 and unprimes the siphon made by the latter. This unpriming hole being above the lower end of the exhaust pipe, liquids or the rubbish eventually floating on the clarified liquid will not be discharged in a course of a normal cycle, any soiling of the exhaust pipe will thus be avoided. It will be noted that the muds, which have made a deposit during a decantation phase, will not be discharged during the discharging phase. When the air compressor has maintained an excess of pressure for a predetermined period of time, the clock deactuates same and sets back the control valve in the position where the inside of the tank is connected to the atmospheric pressure. At this stage, the tank is ready again to receive used waters for a new cycle.

In a particular and not limitative example of operation, one can provide a regular period of oxygenation of a quarter of hour every hour, from 5 o'clock to 24 o'clock, a decantation from midnight to four in the morning, and a pressurization at 4 o'clock for a necessary period of time to discharge a quantity of liquid corresponding to a full tank (i.e. when the liquid reaches the level of the outlet of the exhaust pipe 3).

Biological muds and floating elements are regularly pumped, for example one time a year, during the special overhaul operations of the device.

According to the above description, it appears that, if the muds reach the lower end of the pipe 3 before the annual maintenance, they will be evacuated when setting the tank under pressure. It results no drawbacks in the use, since a sufficient quantity of muds corresponding to the volume of the tank will remain in same below the lower end of the pipe 3. When dimensioning the tank, it is sufficient to provide this particular volume, in relation with the whole volume of the tank, in order to ensure an efficient operation.

According to another embodiment, there is provided at the lower end of the exhaust pipe a synthetic diaphragm for refining the effluents. Such a diaphragm holds the small particles, and warrants the effluent quality, whatever is the evacuation periodicity of the muds in the tank. The use of pressure for evacuating the water from the tank is then particularly adequate, since such refining diaphragms cannot work with too low pressures. The diaphragm will be chosen in relation with the results to be obtained, but it must be pervious enough so as not to be blocked and for being resistant to chemical and biological agressions.

According to another embodiment of the present invention, heating means are provided around the feeding pipe in order to permit the use of a purifying device according to the present invention in the countries where the temperature is sometimes very low. Heating means may, for example, comprise a tight electric resistor which is coiled around the air feeding pipe 6 and thus permits to maintain the effluent at the desired temperature. The heat obtained in that manner serves one one hand to warm the external air introduced in the tank and on the other hand to maintain the products in the tank at a sufficient temperature to ensure their biological action.

The present invention is not limited to the example of the embodiments above described but is on the contrary liable of variants and modifications that will appear to those skilled in the art.

What is claimed is:

1. A water purifying device comprising a single tank defining a single chamber, a water feeding pipe extending into said chamber and having an outlet disposed in said chamber at a selected level, a water exhaust pipe extending into said chamber and having an outlet located in said chamber at a level above said selected level, the level at which said water exhaust pipe extends out of said chamber being lower than the level at which said water feeding pipe extends into said chamber, said tank having an upper portion and means for supplying gas under pressure at said upper portion, a stationary gas dispersing means extending into said tank to the lower part of said chamber, gas flow means located at the upper part of said chamber, and control valve means connected to said gas supplying means, said control valve means being movable, at least, between a first position, wherein gas under pressure is supplied to said stationary gas dispersing means and said gas flow means is connected to the atmosphere, and a second position, wherein said gas supplying means is connected to said gas flow means and said stationary gas dispersing means is closed.

2. A water purifying device comprising a single tank defining a single chamber, a waste water feeding pipe and a water exhaust pipe extending into said tank, said water exhaust pipe having lower and upper ends which are at respectively higher and lower levels than the ends of said water feeding pipe, said device further comprising an air compressor and control valve means located in the upper part of said tank, said control valve means being movable from one position for supplying compressed air from said air compressor to a stationary gas dispersing means extending inside said tank, and to a second position wherein said compressed air is supplied to the upper part of said tank.

3. A water purifying device, according to claim 1, wherein said control valve means comprises a venting port connected with the upper part of the tank when said control valve is in a position where said auxiliary gas under pressure is connected to said gas dispersing means, said venting port being calibrated in relation with the flow of said auxiliary gas under pressure to maintain a slight excess of pressure in the tank during the venting operation.

4. A water purifying device, according to claim 1, wherein said gas dispersing means comprising a generally conical-shaped cupola, having the vertex at the top, set at the lower end of a substantially vertical tube, which is located inside the tank and connected to said control valve means.

5. A water purifying device, according to claim 2, wherein the walls of said exhaust pipe have an opening slightly above its lower end.

6. A water purifying device, according to claim 3, wherein said venting port of said control valve is connected to the upper part of said feeding pipe.

7. A water purifying device, according to claim 1, wherein said exhaust pipe comprises at its lower end a pervious synthetic diaphragm.

8. A water purifying device, according to claim 1, wherein said means for supplying gas under pressure is connected to said control valve means by means of a gas feeding pipe and said gas feeding pipe is provided with a non-return valve.

9. A water purifying device, according to claim 2, also comprising a heating means, so located to warm the gas introduced in the tank, and to maintain the tank at an appropriate temperature for ensuring a sufficient biological reaction.

* * * * *